(12) United States Patent
Tomosada et al.

(10) Patent No.: US 10,202,087 B2
(45) Date of Patent: Feb. 12, 2019

(54) WIRING STRUCTURE FOR SLIDING DOOR

(71) Applicant: Yazaki Corporation, Tokyo (JP)

(72) Inventors: Kosuke Tomosada, Shizuoka (JP); Naoto Kogure, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/813,248

(22) Filed: Nov. 15, 2017

(65) Prior Publication Data

US 2018/0178740 A1    Jun. 28, 2018

(30) Foreign Application Priority Data

Dec. 28, 2016 (JP) ................ 2016-255981

(51) Int. Cl.
| | | |
|---|---|---|
| *H02G 11/00* | (2006.01) | |
| *B60R 16/027* | (2006.01) | |
| *B60J 5/06* | (2006.01) | |
| *B60R 16/02* | (2006.01) | |
| *H02G 3/04* | (2006.01) | |

(52) U.S. Cl.
CPC ........ *B60R 16/0215* (2013.01); *B60R 16/027* (2013.01); *H02G 3/0462* (2013.01); *H02G 11/00* (2013.01); *B60J 5/06* (2013.01)

(58) Field of Classification Search
CPC  B60R 16/0215; B60R 16/027; H02G 3/0462; H02G 11/00; B60J 5/06
USPC ...................................... 174/72 A
See application file for complete search history.

(56) References Cited

U.S. PATENT DOCUMENTS

| | | | | | |
|---|---|---|---|---|---|
| 5,992,097 | A | * | 11/1999 | Makiuchi ............ | E05D 15/1047 49/209 |
| 6,161,894 | A | * | 12/2000 | Chapman ................... | B60J 5/06 296/155 |
| 7,284,785 | B2 | * | 10/2007 | Gotou .................. | H02G 3/0475 174/72 A |
| 7,585,014 | B2 | * | 9/2009 | Nishimura ................. | B60J 5/06 296/146.4 |
| 7,980,622 | B2 | * | 7/2011 | Noritsugu ............ | B60R 16/0215 174/72 A |
| 8,212,383 | B2 | * | 7/2012 | Ushiyama ........... | B60R 16/0207 307/10.1 |
| 8,413,379 | B2 | * | 4/2013 | Ishida ....................... | B60R 3/02 182/90 |
| 2006/0042168 | A1 | * | 3/2006 | Yamada ................ | E05F 15/646 49/360 |
| 2008/0238020 | A1 | * | 10/2008 | Okada ....................... | B60R 3/02 280/166 |
| 2009/0035953 | A1 | * | 2/2009 | Tsubaki .............. | B60R 16/0215 439/34 |

FOREIGN PATENT DOCUMENTS

JP          2010-184593 A          8/2010

* cited by examiner

*Primary Examiner* — Michael F McAllister
(74) *Attorney, Agent, or Firm* — Sughrue Mion, PLLC (57) ABSTRACT

A wiring structure for a sliding door includes a flexible conductor that connects a sliding door and a vehicle body across a trajectory space through which a slide portion of the sliding door passes, the slide portion being guided by a guide portion provided on a vehicle body side, and a forming member that forms a curved portion in a portion of the conductor traversing the trajectory space, and extends a portion of the conductor connected to the curved portion along the guide portion.

20 Claims, 9 Drawing Sheets

WIRING STRUCTURE FOR SLIDING DOOR

CROSS-REFERENCE TO RELATED APPLICATION(S)

The present application claims priority to and incorporates by reference the entire contents of Japanese Patent Application No. 2016-255981 filed in Japan on Dec. 28, 2016.

BACKGROUND OF THE INVENTION

1. Field of the Invention

The present invention relates to a wiring structure for a sliding door.

2. Description of the Related Art

Conventionally, there is a technique of a wiring structure for a sliding door for connecting a vehicle body and a sliding door. For example, Japanese Patent Application Laid-open No. 2010-184593 discloses a technique of a harness wiring structure for a sliding door, including a harness bridged between a vehicle body and a sliding door, and a holder positioned below a step member provided to a door opening and configured to move together with the sliding door.

In a wiring structure for a sliding door, it is desirable to reduce a space dedicated for routing. For example, in a case where the sliding door opens or closes, an extra portion is generated in a wire harness along with the movement of the door. A space to accommodate this extra portion is necessary. However, securing a dedicated space for accommodating the extra portion would enlarge a dedicated space for routing.

SUMMARY OF THE INVENTION

An object of the present invention is to provide a wiring structure for a sliding door capable of reducing a dedicated space for routing.

According to one aspect of the present invention, a wiring structure for a sliding door includes a flexible conductor that connects a sliding door and a vehicle body across a trajectory space through which a slide portion of the sliding door passes, the slide portion being guided by a guide portion provided on a vehicle body side; and a forming member that forms a curved portion in a portion of the conductor traversing the trajectory space, and extends a portion of the conductor connected to the curved portion along the guide portion.

According to another aspect of the present invention, in the wiring structure for a sliding door, it is preferable that the forming member forms a linear portion that linearly extends in at least one of a portion of the conductor on a sliding door side relative to the curved portion and a portion of the conductor on the vehicle body side relative to the curved portion.

According to still another aspect of the present invention, in the wiring structure for a sliding door, it is preferable that the forming member is a plate-like elastic body disposed along the conductor so as to deform together with the conductor, and a cross section of the forming member orthogonal to an axial direction of the conductor has a curved shape protruding toward one side.

According to still another aspect of the present invention, in the wiring structure for a sliding door, it is preferable to further include a door-side holding portion that is provided on the sliding door and holds the conductor; and a vehicle body-side holding portion that is provided on the vehicle body side relative to the guide portion and holds the conductor, wherein the plate-like elastic body is disposed in a range from the door-side holding portion to the vehicle body-side holding portion.

According to still another aspect of the present invention, in the wiring structure for a sliding door, it is preferable to further include a tubular exterior casing that has stretchability, and accommodates and holds the conductor and the plate-like elastic body therein.

According to still another aspect of the present invention, in the wiring structure for a sliding door, it is preferable that a plurality of flat cables are provided as the conductor.

According to still another aspect of the present invention, in the wiring structure for a sliding door, it is preferable that the plate-like elastic body is disposed in the curved portion so as to be positioned on an inner side relative to the conductor in a curving direction.

According to still another aspect of the present invention, in the wiring structure for a sliding door, it is preferable that a plurality of the plate-like elastic bodies are provided, and the plurality of plate-like elastic bodies and the plurality of flat cables are laminated.

According to still another aspect of the present invention, in the wiring structure for a sliding door, it is preferable to further include a restricting portion that is disposed along the guide portion, and restricts the curved portion from deviating from the trajectory space.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a wiring structure for a sliding door according to an embodiment of the present invention will be described in detail with reference to the drawings. Note that the present invention is not limited to this embodiment. In addition, constituent elements in the following embodiment include those that can be easily conceived by those skilled in the art or substantially the same elements.

Embodiment

Figure 1:
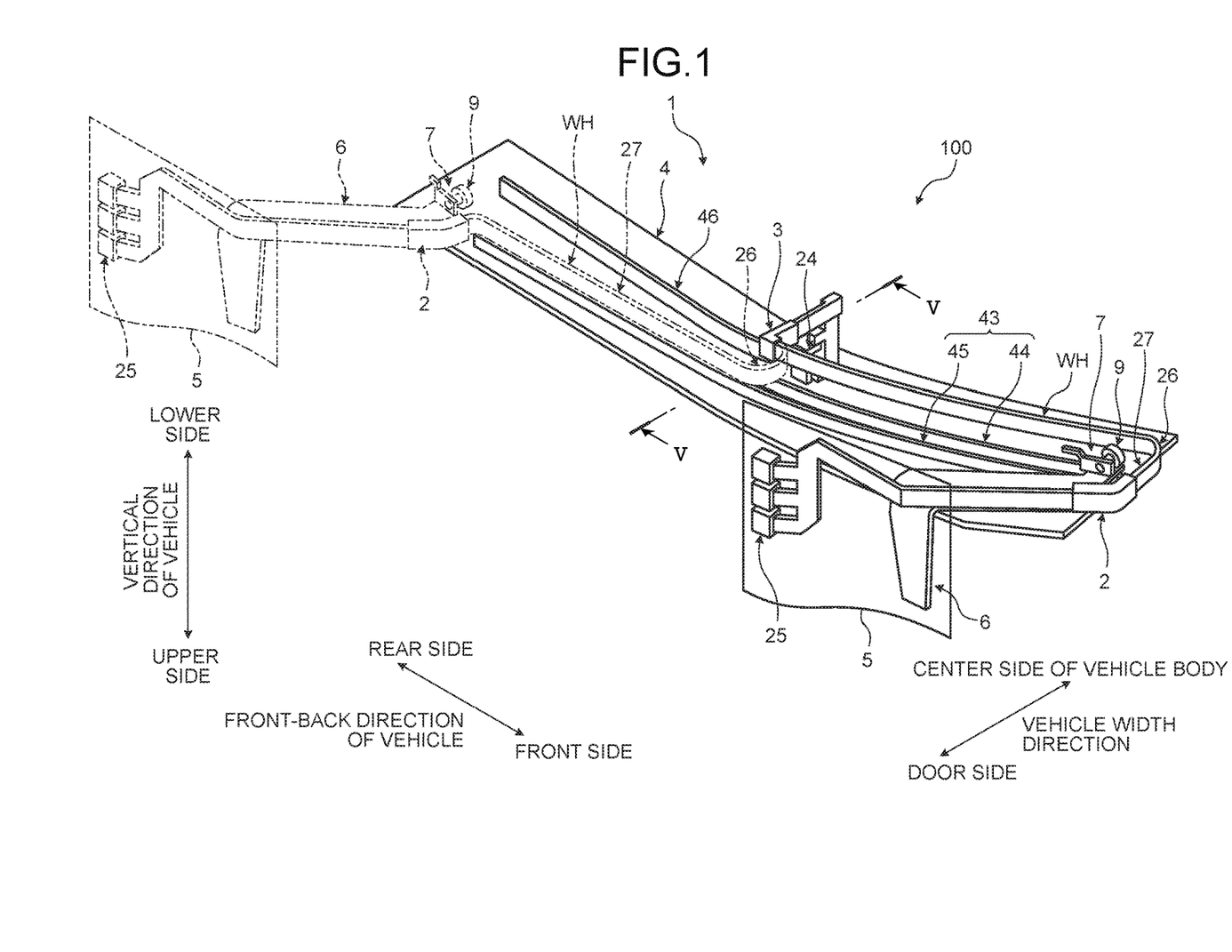
FIG. 1 is a perspective view illustrating a wiring structure for a sliding door according to an embodiment.
Figure 2:
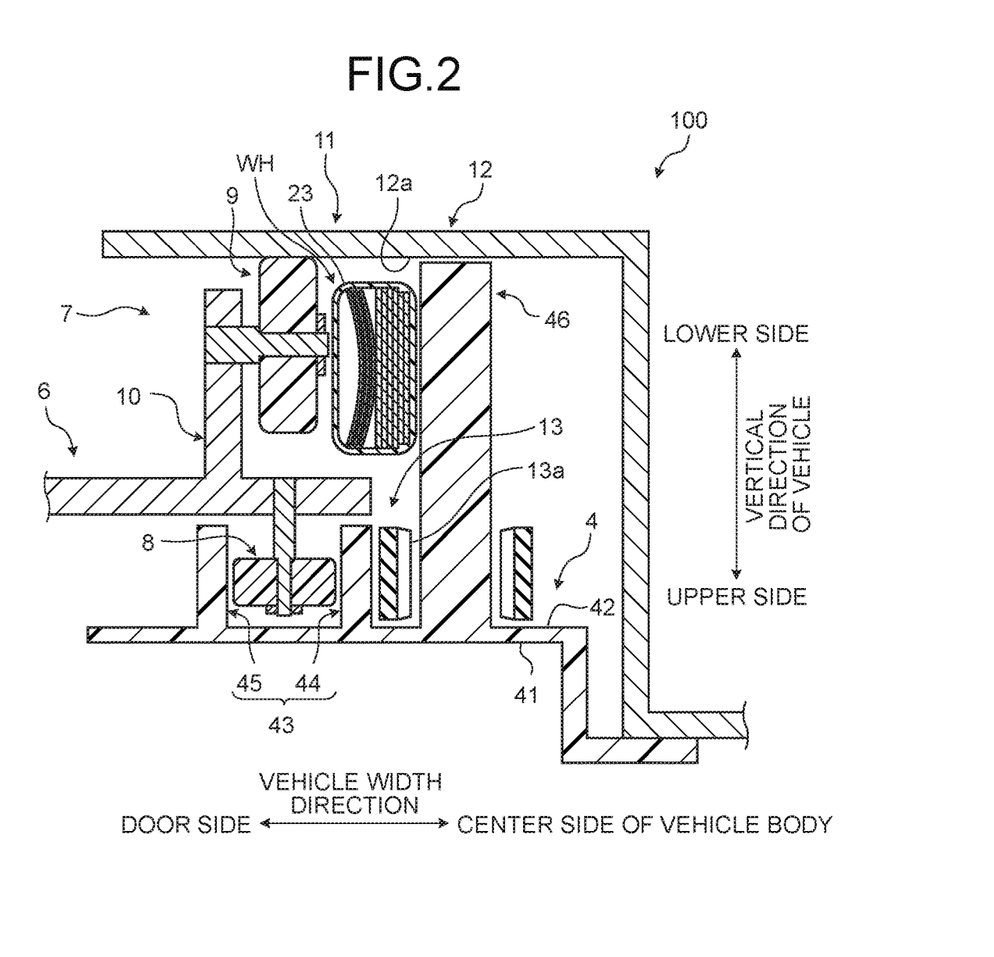
FIG. 2 is a cross-sectional view illustrating a slide portion and a guide portion according to the embodiment.
Figure 3:
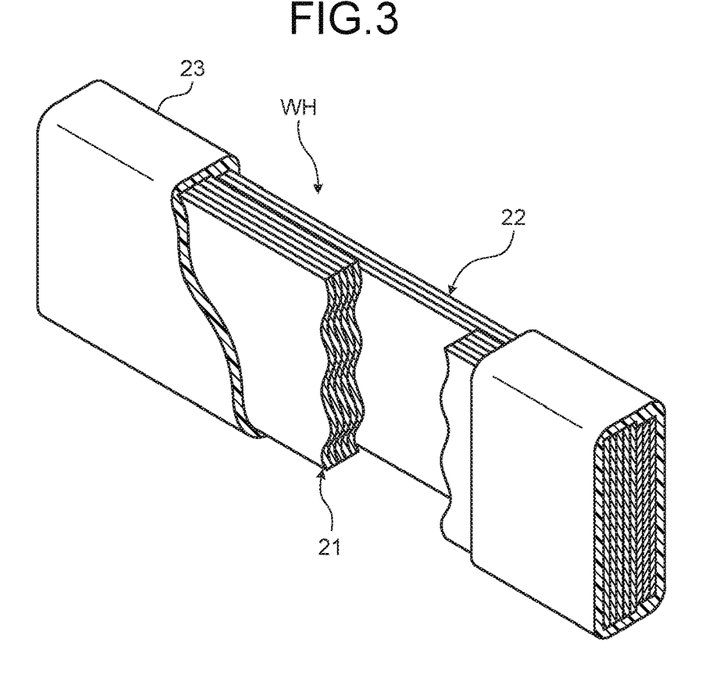
FIG. 3 is a perspective view illustrating an internal structure of a wire harness according to the embodiment.
Figure 4:
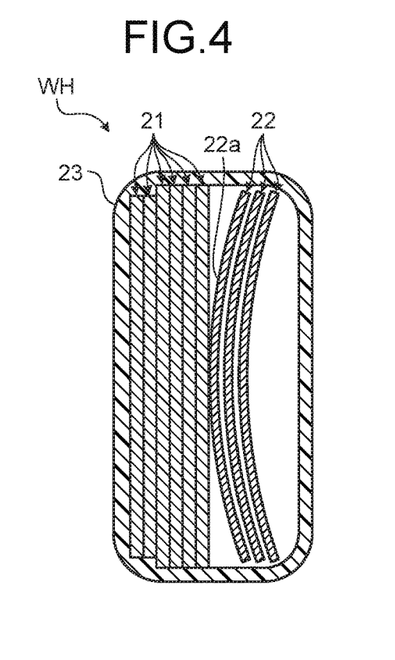
FIG. 4 is a cross-sectional view of the wire harness according to the embodiment.
Figure 5:
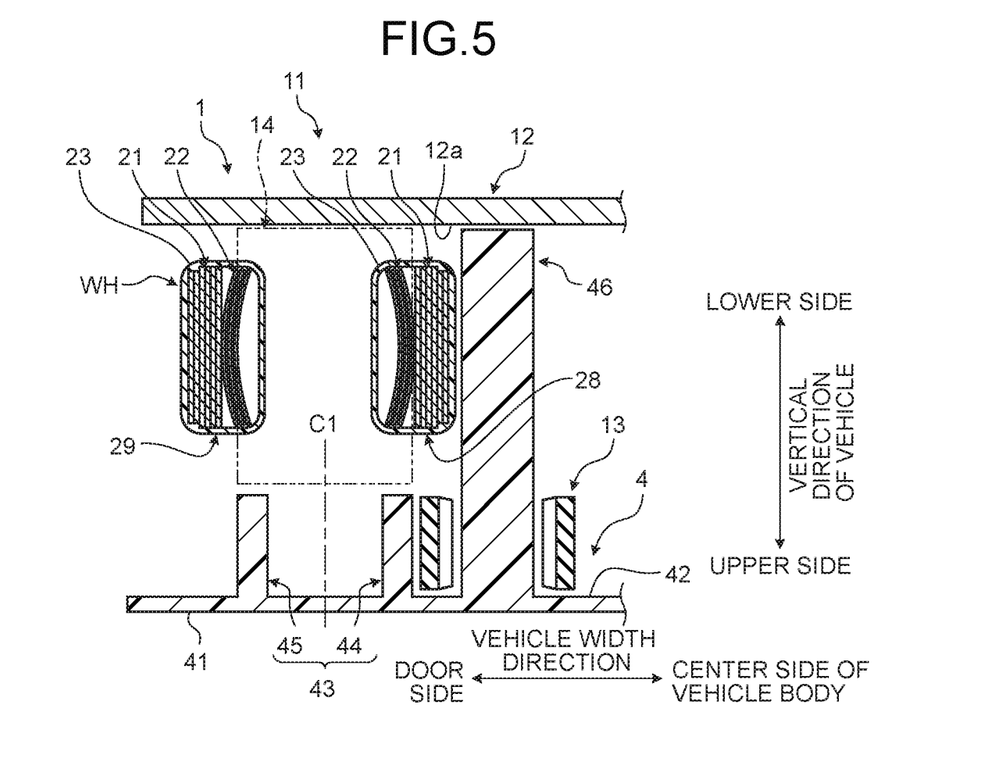
FIG. 5 is a cross-sectional view illustrating the wire harness and the guide portion according to the embodiment.

An embodiment will be described with reference to FIGS. 1 to 5. The present embodiment relates to a wiring structure for a sliding door. FIG. 1 is a perspective view illustrating a wiring structure for a sliding door according to the embodiment. FIG. 2 is a cross-sectional view illustrating a slide portion and a guide portion according to the embodiment. FIG. 3 is a perspective view illustrating an internal structure of a wire harness according to the embodiment. FIG. 4 is a cross-sectional view of the wire harness according to the embodiment. FIG. 5 is a cross-sectional view illustrating the wire harness and the guide portion according to the embodiment.

As illustrated in FIG. 1, a wiring structure 1 for a sliding door according to the present embodiment includes a wire harness WH, a door-side holding portion 2, and a vehicle body-side holding portion 3. The wire harness WH is disposed in a step member 4 of a vehicle 100. The step member 4 is disposed in an opening that is opened and closed by a sliding door 5 in the body of the vehicle 100. The step member 4 is disposed at a lower end portion of the opening and fixed to the body of the vehicle 100, for example, a body panel 12 (see FIG. 2) described below. The step member 4 is molded from, for example, a synthetic resin. In the wire harness WH, the door-side holding portion 2 and a lower arm 6 illustrated in FIG. 1, a solid line illustrates a fully closed state of the sliding door 5, and an alternate long and two short dashes line illustrates a fully opened state of the sliding door 5.

In the step member 4, the surface on the upper side of the vehicle is referred to as a front surface 41, while the surface on the lower side of the vehicle is referred to as a rear surface 42. The wire harness WH is disposed on the side of the rear surface 42 of the step member 4. A step-side guide portion 43 is provided on the rear surface 42 of the step member 4. The step-side guide portion 43 guides a slide portion 7 disposed on the lower arm 6 of the sliding door 5. The lower arm 6 is an arm fixed to a lower portion of the sliding door 5. The slide portion 7 is provided at a distal end portion of the lower arm 6 on the center side of the vehicle body.

FIG. 2 is a cross-sectional view of a position indicated by line V-V of FIG. 1, and illustrates the state at the time when the slide portion 7 passes through this cross-sectional position. As illustrated in FIG. 2, the slide portion 7 includes a first roller 8, a second roller 9, and a support portion 10. The support portion 10 is provided at the distal end of the lower arm 6 on the center side of the vehicle body. The support portion 10 may be a separate member from the lower arm 6. The first roller 8 is disposed on the support portion 10 on the upper side of the vehicle. The first roller 8 is supported by the support portion 10 so as to be rotatable around a rotation axis in the vertical direction of the vehicle. The second roller 9 is disposed on the support portion 10 on the lower side of the vehicle. The second roller 9 is supported by the support portion 10 so as to be rotatable around a rotation axis in the vehicle width direction.

As illustrated in FIG. 2, the step-side guide portion 43 protrudes from the rear surface 42 of the step member 4 toward the lower side of the vehicle. The step-side guide portion 43 is provided on the step member 4 from the end portion thereof on the front side of the vehicle to the end portion thereof on the rear side of the vehicle. The step-side guide portion 43 has a pair of wall portions facing each other and is molded integrally with the main body of the step member 4. The step-side guide portion 43 has a first wall portion 44 and a second wall portion 45. The first wall portion 44 is positioned closer to the center side of the vehicle body than the second wall portion 45 is, in the vehicle width direction. The step-side guide portion 43 extends along the front-back direction of the vehicle. As illustrated in FIG. 1, the step-side guide portion 43 is provided on an area from the front end portion to the rear end portion of the step member 4 in the front-back direction of the vehicle. A part of the step-side guide portion 43 on the front side of the vehicle is curved toward the center side of the vehicle body as going toward the front side of the vehicle. Due to this curved shape, the sliding door 5 moves toward the center side of the vehicle body as sliding toward the front side of the vehicle and closes the opening of the vehicle body.

Referring again to FIG. 2, the first roller 8 is disposed in a space between the first wall portion 44 and the second wall portion 45. The first roller 8 is guided by the step-side guide portion 43 to thereby slide the sliding door 5 along a predetermined trajectory.

A partition wall 46 is provided on the center side of the vehicle body from the step-side guide portion 43. The partition wall 46 is a rib-like wall portion protruding from the rear surface 42 of the step member 4 toward the lower side of the vehicle, and is molded integrally with the main body of the step member 4. The partition wall 46 is provided on the step member 4 from the end portion thereof on the front side of the vehicle to the end portion thereof on the rear side of the vehicle, along the step-side guide portion 43. A passage of a belt 13 is formed between the partition wall 46 and the first wall portion 44. The belt 13 is an endless belt made of rubber, for example. The belt 13 is disposed so as to surround the partition wall 46. Protrusions 13a are formed at equal intervals on the inner peripheral surface of the loop-like belt 13. The slide portion 7 is coupled to the belt 13, and is driven by the rotational movement of the belt 13 to move in the front-back direction of the vehicle. A motor (not illustrated) is disposed on the side of the front surface 41 of the step member 4. The belt 13 is coupled to the motor via a sprocket or the like, and is driven by this motor to circulate.

The body panel 12 is positioned below the step member 4 in the vehicle. The body panel 12 has a support surface 12a facing the rear surface 42 of the step member 4. The body panel 12 is fixed to the vehicle body, and supports the second roller 9 from below. That is, the second roller 9 moves in the front-back direction of the vehicle and is guided by the support surface 12a of the body panel 12 while rolling on the support surface 12a. The body panel 12 constitutes, together with the step-side guide portion 43, a guide portion 11 that guides the slide portion 7.

The wire harness WH electrically connects the body of the vehicle 100 and the sliding door 5. As illustrated in FIGS. 1 and 3, the wire harness WH includes a flexible flat cable (FFC) 21, a plate-like elastic body 22, an exterior casing 23, a first connector 24, and a second connector 25. The FFC 21 is a flexible flat electrical connecting member. The FFC 21 is a conductor covered with an insulating coating. For example, the conductor is made of a conductive metal such as copper or aluminum. The wire harness WH of the present embodiment includes a plurality of FFCs 21. The FFCs 21 are laminated in the thickness direction thereof. The FFC 21 is a power supply line or a signal line that connects the vehicle body and the sliding door 5.

The plate-like elastic body 22 is a plate-shaped member having elasticity. As illustrated in FIG. 4, the plate-like elastic body 22 has a curved cross-sectional shape in a direction orthogonal to the axial direction of the FFC 21. The cross-sectional shape of the plate-like elastic body 22 is a curved shape protruding toward one side in the plate thickness direction. The plate-like elastic body 22 is configured to generate a restoring force to restore the plate-like elastic body 22 to the above-described curved shape. The plate-like elastic body 22 of the present embodiment includes so-called convex steel, and is a metal plate formed in the above-described curved shape in advance.

The plate-like elastic body 22 and the FFC 21 are accommodated inside the exterior casing 23 having stretchability. The exterior casing 23 has a tubular shape, and is formed by braiding resin fibers, for example. As illustrated in FIG. 4, the exterior casing 23 accommodates and holds the plurality of FFCs 21 and a plurality of plate-like elastic bodies 22 therein. The plurality of laminated plate-like elastic bodies 22 is disposed so as to be overlaid on one surface of the plurality of laminated FFCs 21. The plurality of FFCs 21 and the plurality of plate-like elastic bodies 22 are kept in contact with each other due to the contraction force of the exterior casing 23. In the present embodiment, the plate-like elastic body 22 is accommodated in the exterior casing 23 with a protruding surface 22a thereof facing the FFC 21.

The first connector 24 is connected to one end of the FFC 21. The second connector 25 is connected to the other end of the FFC 21. The first connector 24 is connected to a vehicle body-side connector on the center side of the vehicle body from the step-side guide portion 43, in the vehicle width direction. The second connector 25 is connected to a connector of the sliding door 5 on the side of the sliding door 5 from the step-side guide portion 43, in the vehicle width direction. The wire harness WH connects the vehicle body and the sliding door 5 across the step-side guide portion 43. More specifically, the wire harness WH is routed across, in the vehicle width direction, the space between the body panel 12 and the distal end of the step-side guide portion 43 in the protruding direction. In other words, the wire harness WH connects the sliding door 5 and the vehicle body across a trajectory space 14 (see FIG. 5) through which the slide portion 7 passes.

As illustrated in FIG. 1, one end side of the wire harness WH is held by the vehicle body-side holding portion 3. The vehicle body-side holding portion 3 is fixed to the rear surface 42 of the step member 4, for example. The vehicle body-side holding portion 3 is disposed at a central portion of the step member 4 in the front-back direction of the vehicle. In addition, the vehicle body-side holding portion 3 is disposed at a central portion of the movable range in which the slide portion 7 moves in the front-back direction of the vehicle.

The vehicle body-side holding portion 3 of the present embodiment holds the wire harness WH in a posture bent at a substantially right angle. A portion of the wire harness WH on the side of the sliding door 5 from the vehicle body-side holding portion 3 extends from the vehicle body-side holding portion 3 toward the front side of the vehicle. The vehicle body-side holding portion 3 holds the wire harness WH such that the FFC 21 and the plate-like elastic body 22 extend in parallel with the step-side guide portion 43, for example. Furthermore, a portion of the wire harness WH on the vehicle body side of the vehicle body-side holding portion 3 extends from the vehicle body-side holding portion 3 toward the center of the vehicle body.

The other end side of the wire harness WH is held by the door-side holding portion 2. The door-side holding portion 2 is fixed to the lower arm 6. The door-side holding portion 2 of the present embodiment holds the wire harness WH in a posture bent at an obtuse angle. A portion of the wire harness WH on the vehicle body side of the door-side holding portion 2 extends from the door-side holding portion 2 toward the center of the vehicle body. A portion of the wire harness WH on the side of the door panel of the sliding door 5 from the door-side holding portion 2 extends from the door-side holding portion 2 along one side of the lower arm 6. Note that in the present embodiment, the plate-like elastic body 22 is not disposed in a portion of the wire harness WH on the side of the door panel from the door-side holding portion 2. In other words, the plate-like elastic body 22 is disposed in the portion of the wire harness WH ranging from the door-side holding portion 2 to the vehicle body-side holding portion 3.

As illustrated in FIG. 1, a curved portion 26 is formed in the wire harness WH. The curved portion 26 has a curved shape in which the center axis of the wire harness WH is deformed so as to be curved. The curved portion 26 is also a curved portion at which the extending direction of the wire harness WH changes. The curved portion 26 is formed in the trajectory space 14 illustrated in FIG. 5. FIG. 5 illustrates a cross section taken along line V-V of FIG. 1. The wire harness WH illustrated in FIG. 5 is the wire harness WH in the fully opened state, that is, in the state illustrated by the alternate long and two short dashes line in FIG. 1. The trajectory space 14 is a space through which the slide portion 7 of the sliding door 5 passes. The trajectory space 14 in the present embodiment is a space between the distal end of the step-side guide portion 43 in the protruding direction and the body panel 12, as illustrated in FIG. 5. The curved portion 26 is formed so as to be at least partially positioned in the trajectory space 14.

Typically, the range of the trajectory space 14 in the vertical direction of the vehicle is the lower side of the step-side guide portion 43 and the upper side of the body panel 12 in the vehicle. The range of the trajectory space 14 in the vehicle width direction is typically a range including the step-side guide portion 43. More specifically, the range including the step-side guide portion 43 ranges from a surface of the first wall portion 44 on the center side of the vehicle body to a surface of the second wall portion 45 on the door side. Note that the trajectory space 14 may include a range on the center side of the vehicle body from the first wall portion 44, or may include a range on the door side of the second wall portion 45.

The wire harness WH is folded back at this curved portion 26. That is, the wire harness WH extending from the vehicle body-side holding portion 3 toward the front side of the vehicle is bent at the curved portion 26 toward the rear side of the vehicle or the door side in the vehicle width direction. For example, in the state illustrated by the alternate long and two short dashes line in FIG. 1, that is, in the fully opened state of the sliding door 5, the wire harness WH extending from the vehicle body-side holding portion 3 toward the front side of the vehicle is bent toward the rear side of the vehicle at the curved portion 26. The portions of the wire harness WH connected to the curved portion 26 extend in the front-back direction of the vehicle along the step-side guide portion 43.

In addition, in the state illustrated by the solid line in FIG. 1, that is, in the fully closed state of the sliding door 5, the wire harness WH extending from the vehicle body-side holding portion 3 toward the front side of the vehicle is bent at the curved portion 26 toward the door side in the vehicle width direction. In this way, the direction in which the portion on the door side of the curved portion 26 extends is changed according to the position of the sliding door 5. In the fully closed state of the sliding door 5, at least the portion of the wire harness WH on the vehicle body side of the curved portion 26 extends in the front-back direction of the vehicle along the step-side guide portion 43.

The portion of the wire harness WH on the door side of the curved portion 26 is a linear portion 27 extending linearly. The curved portion 26 and the linear portion 27 are formed by the plate-like elastic body 22. The curved portion 26 is locally formed at a portion where the wire harness WH is folded back. The linear portion 27, which is a portion of the wire harness WH on the door side of the curved portion 26, is maintained linear by the plate-like elastic body 22.

The portion of the wire harness WH on the vehicle body side of the curved portion 26 extends along the partition wall 46. In a portion where the partition wall 46 is linear, the wire harness WH extends linearly along the partition wall 46. Meanwhile, in a portion where the partition wall 46 is curved, the wire harness WH extends while being curved along the partition wall 46.

In order to extend the wire harness WH along the partition wall 46, the door-side holding portion 2 of the present embodiment extends the wire harness WH toward the center side of the vehicle body, in other words, toward the partition wall 46. Since the wire harness WH extends from the door-side holding portion 2 toward the center side of the vehicle body, the portion of the wire harness WH on the vehicle body side of the curved portion 26 is pressed against the partition wall 46. Due to this pressing force, the portion of the wire harness WH on the vehicle body side of the curved portion 26 deforms according to the shape of the partition wall 46 and extends along the partition wall 46. This pressing force also determines a relative position, at which the curved portion 26 is formed, with respect to the partition wall 46. That is, the curved portion 26 is formed such that one end of the curved portion 26 is in contact with the partition wall 46.

In the wire harness WH of the present embodiment, as illustrated in FIG. 5, a portion 28 of the folded wire harness WH on the vehicle body side is positioned on an extension line of the first wall portion 44, and a portion 29 of the folded wire harness WH on the door side is positioned on an extension line of the second wall portion 45. In other words, the curved portion 26 is curved about a center line C1 of the step-side guide portion 43. Furthermore, the wire harness WH is curved at the curved portion 26 so as to have a symmetrical or substantially symmetrical shape with respect to the center line C1. The plate-like elastic body 22 is configured such that the curved portion 26 is formed in the trajectory space 14 and curved in the above-described shape. The plate thickness, the curved shape, the material, the number of installed sheets and the like of the plate-like elastic body 22 are determined such that the curved portion 26 is formed in the trajectory space 14 and curved in the above-described shape.

As illustrated in FIG. 5, the portion 28 of the wire harness WH on the vehicle body side of the curved portion 26 faces the portion 29 of the wire harness WH on the door side of the curved portion 26 in the vehicle width direction. In each of the portions 28 and 29, the plate-like elastic body 22 is positioned on the inner side of the FFC 21. That is, in the portion 28 on the vehicle body side, the plate-like elastic body 22 is positioned closer to the portion 29 on the door side than the FFC 21 is. Similarly, in the portion 29 on the door side, the plate-like elastic body 22 is positioned closer to the portion 28 on the vehicle body side than the FFC 21 is. As described above, in the wire harness WH of the present embodiment, the plate-like elastic body 22 is disposed in the curved portion 26 so as to be positioned on the inner side of the FFC 21 in the curving direction.

Figure 6:
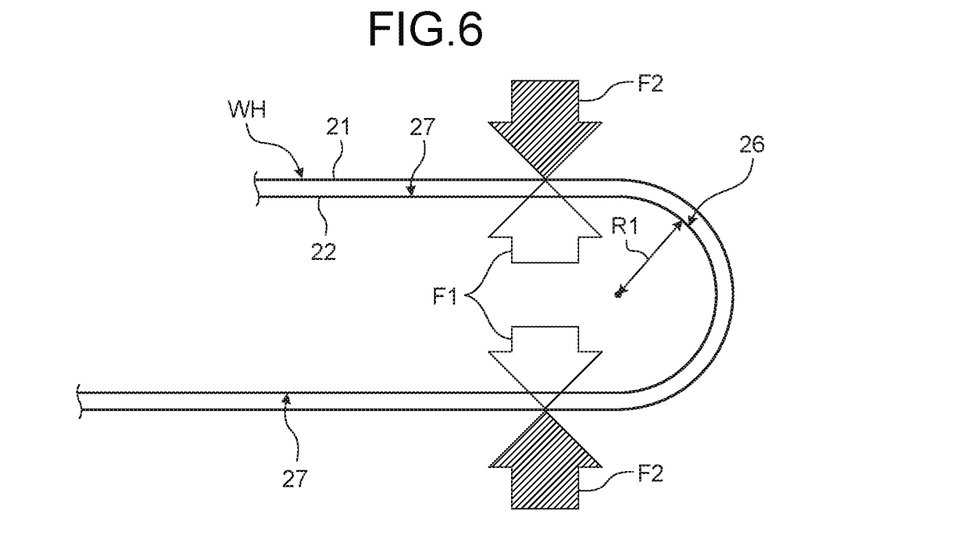
FIG. 6 is a view for describing a balance of forces in the wire harness according to the embodiment.
Figure 7:
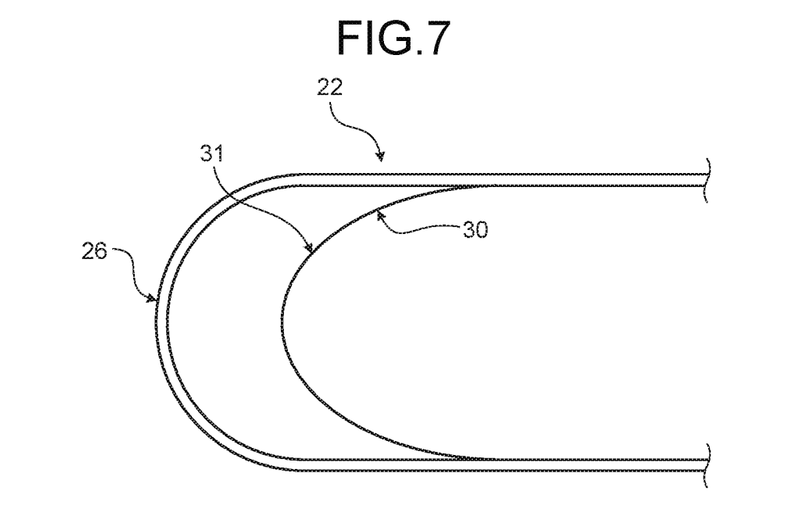
FIG. 7 is a view for describing the shape of a curved portion.
Figure 8:
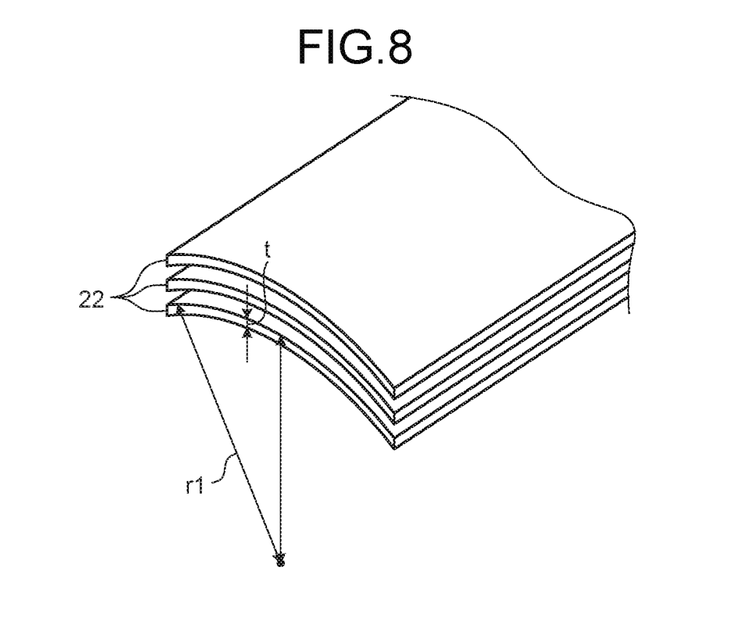
FIG. 8 is a perspective view of a plate-like elastic body according to the embodiment.
Figure 9:
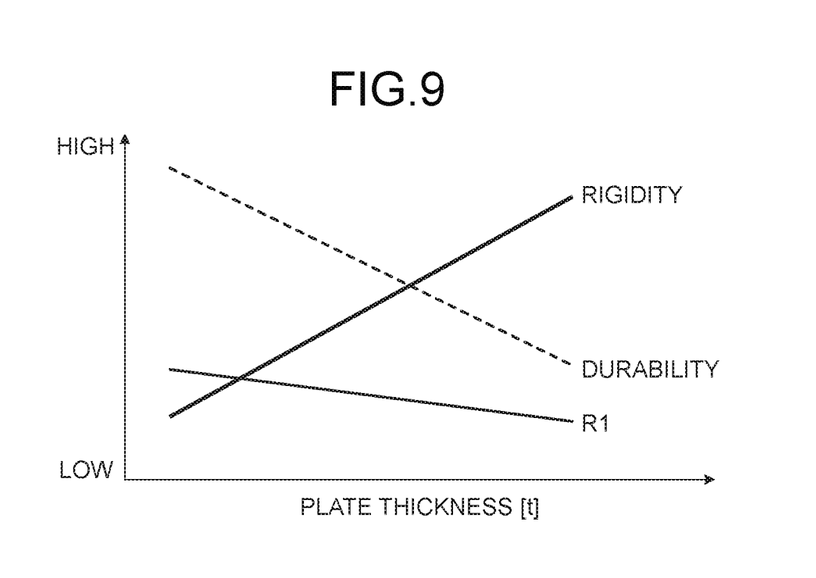
FIG. 9 is a diagram illustrating a relationship between characteristics of the plate-like elastic body and a plate thickness thereof.
Figure 10:
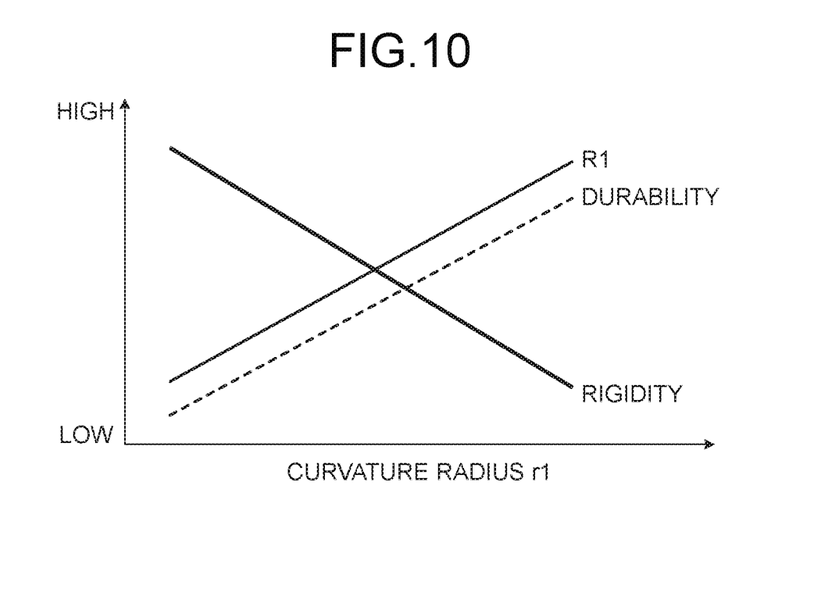
FIG. 10 is a diagram illustrating a relationship between the characteristics of the plate-like elastic body and a curvature radius thereof.
Figure 11:
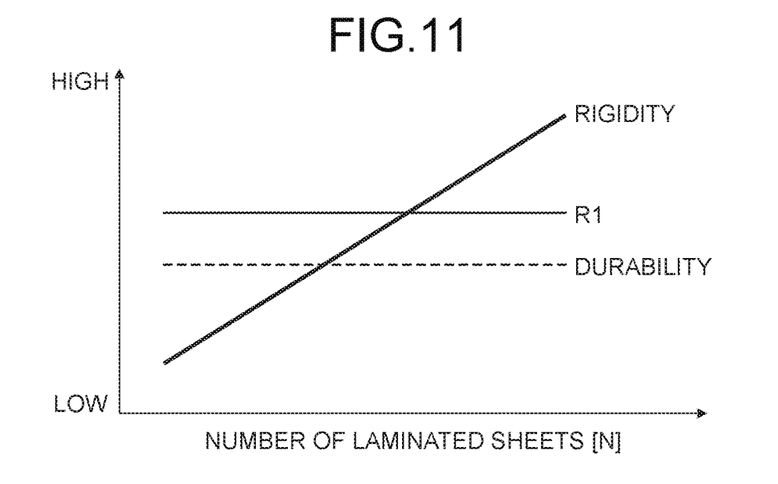
FIG. 11 is a diagram illustrating a relationship between the characteristics of the plate-like elastic body and the number of laminated plates.

The plate-like elastic body 22 will be described in more detail. FIG. 6 is a view for describing a balance of forces in the wire harness. FIG. 7 is a view for describing the shape of the curved portion. FIG. 8 is a perspective view of the plate-like elastic body. FIG. 9 is a diagram illustrating the relationship between the characteristics of the plate-like elastic body and the plate thickness thereof. FIG. 10 is a diagram illustrating the relationship between the characteristics of the plate-like elastic body and the curvature radius thereof. FIG. 11 is a diagram illustrating the relationship between the characteristics of the plate-like elastic body and the number of laminated sheets.

As illustrated in FIG. 6, a repulsive force F1 is generated in the FFC 21 bent into the curved shape. The repulsive force F1 is a restoring force for the FFC 21 to return to a linear shape. The magnitude of the repulsive force F1 depends on, for example, the rigidity of the FFC 21. The plate-like elastic body 22 generates a holding force F2 which is balanced with the repulsive force F1 of the FFC 21. The holding force F2 acts in a direction of maintaining the FFC 21 in the curved shape against the repulsive force F1. The holding force F2 is transmitted to the FFC 21 via the exterior casing 23, for example. The maximum value of the holding force F2 is determined by, for example, the rigidity of the plate-like elastic body 22. The plate-like elastic body 22 of the present embodiment is configured to at least form the curved portion 26 having a desired radius and generate the holding force F2 which is balanced with the repulsive force F1 generated upon formation of the curved portion 26.

An exemplary method for obtaining the desired characteristics of the plate-like elastic body 22 will be described. As illustrated in FIG. 7, the curved shape of the plate-like elastic body 22 when bent is stabilized. FIG. 7 illustrates the plate-like elastic body 22 and a flat steel plate 30 as a comparative example. The flat steel plate 30 is a steel plate having a rectangular cross-sectional shape. When the flat steel plate 30 is bent, a curved portion 31 is formed. The shape of the curved portion 31 is a parabolic curve. Meanwhile, when the plate-like elastic body 22 is bent, the arc-shaped curved portion 26 is formed. The plate-like elastic body 22 has a curved shape in advance protruding toward one side in the plate thickness direction. As a result, the radius of the arc of the curved portion 26 tends to be uniform along the circumferential direction.

The characteristics of the plate-like elastic body 22 can be adjusted by, for example, a plate thickness t and a curvature radius r1 illustrated in FIG. 8, and the number N of the laminated plate-like elastic bodies 22. The plate thickness t is the thickness of one plate-like elastic body 22. The curvature radius r1 is the radius of the curved shape given to the plate-like elastic body 22 in advance. In the plate-like elastic body 22, the cross-sectional shape orthogonal to the longitudinal direction of the plate-like elastic body 22 is an arc shape or substantially an arc shape. The curvature radius r1 is, for example, the radius of an arc shape formed by the outer peripheral surface of the plate-like elastic body 22. The number N of laminated sheets is the number of the laminated plate-like elastic bodies 22.

In FIG. 9, the horizontal axis represents the plate thickness t. FIG. 9 illustrates the rigidity, the durability, and a bending radius R1 of one plate-like elastic body 22. The rigidity is, for example, the bending rigidity against bending at the time of forming the curved portion 26. This rigidity also acts to maintain the shape of the FFC 21 against the repulsive force F1. The durability is the durability against repeated bending. As illustrated in FIG. 6, the bending radius R1 is the radius of the arc shape of the formed curved portion 26. As can be seen from FIG. 9, the larger the plate thickness t, the higher the rigidity. Meanwhile, the larger the plate thickness t, the lower the durability and the smaller the bending radius R1.

In FIG. 10, the horizontal axis represents the curvature radius r1. As in FIG. 9, FIG. 10 illustrates the rigidity, the durability, and the bending radius R1 of one plate-like elastic body 22. The larger the curvature radius r1, the lower the rigidity. Meanwhile, the larger the curvature radius r1, the higher the durability and the larger the bending radius R1.

In FIG. 11, the horizontal axis represents the number N of laminated sheets. The rigidity illustrated in FIG. 11 is the rigidity of the laminate of the plate-like elastic bodies 22 according to the number N of laminated sheets. In FIG. 11, the durability is the durability of each plate-like elastic body 22, and the bending radius R1 is the bending radius R1 of the laminate of the plate-like elastic bodies 22. The bending radius R1 of the laminate is, for example, the bending radius R1 of the innermost plate-like elastic body 22 in the laminate. As can be seen from FIG. 11, the larger the number N of laminated sheets, the higher the rigidity of the laminate. Meanwhile, the durability and the bending radius R1 are constant or substantially constant irrespective of the number N of laminated sheets.

As illustrated in FIGS. 9 and 10, both the plate thickness t and the curvature radius r1 affect all of the rigidity, the durability, and the bending radius R1. Furthermore, both the plate thickness t and the curvature radius r1 have a trade-off characteristic in which the higher the rigidity, the lower the durability. In the present embodiment, a combination of the plate thickness t and the curvature radius r1 of each plate-like elastic body 22 is determined so as to achieve a desired bending radius R1 and durability. Furthermore, the number N of the laminated plate-like elastic bodies 22 is determined so as to achieve desired rigidity. As a result, the laminate of the plate-like elastic bodies 22 according to the present embodiment has a desired bending radius R1, durability, and rigidity.

As described above, the wiring structure 1 for a sliding door of the present embodiment includes the FFC 21 which is a flexible conductor and the plate-like elastic body 22 which is a forming member. The FFC 21 electrically connects the sliding door 5 and the vehicle body across the trajectory space 14. The trajectory space 14 is a space through which the slide portion 7 guided by the guide portion 11 provided on the vehicle body passes. The plate-like elastic body 22 forms the curved portion 26 in a portion of the FFC 21 that traverses the trajectory space 14, and extends, along the guide portion 11, a portion of the FFC 21 that is connected to the curved portion 26.

The curved portion 26 is formed in the trajectory space 14 and the portion of the wire harness WH connected to the curved portion 26 extends along the guide portion 11. With this configuration, the extra portion generated in the wire harness WH is mainly accommodated in the trajectory space 14. Therefore, it is possible to accommodate the extra portion of the wire harness WH without newly providing a dedicated space. In other words, a dedicated space for routing the wire harness WH can be reduced. The curved portion 26 moves in the same direction as the moving direction of the lower arm 6 in accordance with the movement of the lower arm 6 in the front-back direction of the vehicle. Therefore, the extra portion of the wire harness WH is accommodated in the trajectory space 14 without interfering with the slide portion 7.

In the wiring structure 1 for a sliding door of the present embodiment, the portion of the wire harness WH on the vehicle body side of the curved portion 26 extends along the partition wall 46. That is, the wire harness WH is supported by the partition wall 46. The partition wall 46 of the present embodiment functions as a forming member that forms the curved portion 26 in the trajectory space 14. The partition wall 46 also has a function of extending, along the guide portion 11, the portion of the wire harness WH connected to the curved portion 26. In addition, since the wire harness WH is supported by the partition wall 46, the wire harness WH is less likely to vibrate even if the vehicle vibrates. As a result, interference between the wire harness WH and other parts is less likely to occur. In addition, since the vibration is suppressed, the electrical connection between the vehicle body and the sliding door 5 is stabilized.

Furthermore, in the wiring structure 1 for a sliding door of the present embodiment, the linear portion 27 is formed at least in a portion of the wire harness WH on the door side of the curved portion 26. Therefore, the bulge of the wire harness WH toward the door side is suppressed. In the present embodiment, the plate-like elastic body 22 is illustrated as a member that forms the linear portion 27. The linear portion 27 is formed and extends along the guide portion 11. With this configuration, the space required for accommodating the extra portion of the wire harness WH is reduced.

The forming member provided in the wiring structure 1 for a sliding door of the present embodiment is the plate-like elastic body 22 disposed along the FFC 21 so as to deform together with the FFC 21. The cross section of the plate-like elastic body 22 orthogonal to the axial direction of the FFC 21 has the curved shape protruding toward one side. The portions of the wire harness WH other than the curved portion 26 are easily maintained linear by the plate-like elastic body 22. That is, the entire shape of the wire harness WH is less likely to bulge in the vehicle width direction. Therefore, the dedicated space for routing the wire harness WH is less likely to increase. In addition, interference between the wire harness WH and other parts is less likely to occur. The posture of the wire harness WH is stabilized by the plate-like elastic body 22, and the wire harness WH is hardly vibrated or deflected along the vehicle width direction or the vertical direction of the vehicle.

The wiring structure 1 for a sliding door of the present embodiment includes the door-side holding portion 2 and the vehicle body-side holding portion 3. The plate-like elastic body 22 is disposed in the range from the door-side holding portion 2 to the vehicle body-side holding portion 3. With this configuration, the posture of the wire harness WH in the range from the door-side holding portion 2 to the vehicle body-side holding portion 3 is stabilized. One end of the plate-like elastic body 22 is preferably held by the door-side holding portion 2, while the other end of the plate-like elastic body 22 is preferably held by the vehicle body-side holding portion 3. When both ends of the plate-like elastic body 22 are thus held, the posture of the wire harness WH is easily stabilized and the position where the curved portion 26 is formed is easily stabilized. Alternatively, the plate-like elastic body 22 may be held by either one of the door-side holding portion 2 and the vehicle-body-side holding portion 3 but not held by the other. For example, in a case where the door-side holding portion 2 holds the plate-like elastic body 22 while pressing the wire harness WH against the partition wall 46, the vehicle body-side holding portion 3 may not hold the plate-like elastic body 22.

The wiring structure 1 for a sliding door of the present embodiment includes the tubular exterior casing 23 having stretchability that accommodates and holds the FFC 21 and the plate-like elastic body 22 therein. Since the FFC 21 and the plate-like elastic body 22 are held by the exterior casing 23 having stretchability, the FFC 21 and the plate-like elastic body 22 are likely to deform together.

The wiring structure 1 for a sliding door of the present embodiment includes the plurality of FFCs 21 as conductors. When the FFCs 21 as band-shaped conductors are laminated, it is easy to deal with an increase or decrease in signal lines and power supply lines while securing appropriate flexibility. Note that the flat cable is not limited to the FFC 21. For example, the flat cable includes a band-shaped cable other than what is called an FFC.

In the wiring structure 1 for a sliding door of the present embodiment, the plate-like elastic body 22 is disposed in the curved portion 26 so as to be positioned on the inner side of the FFC 21 in the curving direction. Since the FFC 21 is positioned on the outer side, the degree of curve of the FFC 21 becomes gentle, and the bending load applied to the FFC 21 is reduced.

The wiring structure 1 for a sliding door of the present embodiment includes the plurality of plate-like elastic bodies 22 and the plurality of laminated plate-like elastic bodies 22 and FFCs 21. The plurality of laminated plate-like elastic bodies 22 constitutes a forming member having a desired bending radius R1, durability, and rigidity.

The partition wall 46 of the present embodiment is disposed along the guide portion 11, and functions as a restricting portion that restricts the curved portion 26 from deviating from the trajectory space 14. The partition wall 46 supports the wire harness WH from the center side of the vehicle body and restricts the curved portion 26 from deviating from the trajectory space 14 toward the center side of the vehicle body. Therefore, the partition wall 46 can reduce the dedicated space for routing the wire harness WH.

Meanwhile, the vehicle body-side holding portion 3 of the present embodiment is disposed at the central portion of the movable range of the slide portion 7 in the front-back direction of the vehicle. Therefore, it is possible to minimize the length of the wire harness WH from the vehicle body-side holding portion 3 to the door-side holding portion 2. The entire length of the wire harness WH can be greatly shortened as compared with a case where the vehicle body-side holding portion 3 is disposed at the end portion on the front or rear side of the vehicle.

According to the wiring structure 1 for a sliding door of the present embodiment, it is possible to modularize the wire harness WH together with the door parts such as the step member 4 and the lower arm 6. For example, it is possible to attach the wire harness WH to the step member 4 and the like in advance before the step member 4 and the like are attached to the vehicle body. As a result, the routing work is simplified and the assemblability is improved.

First Modification of Embodiment

Figure 12:
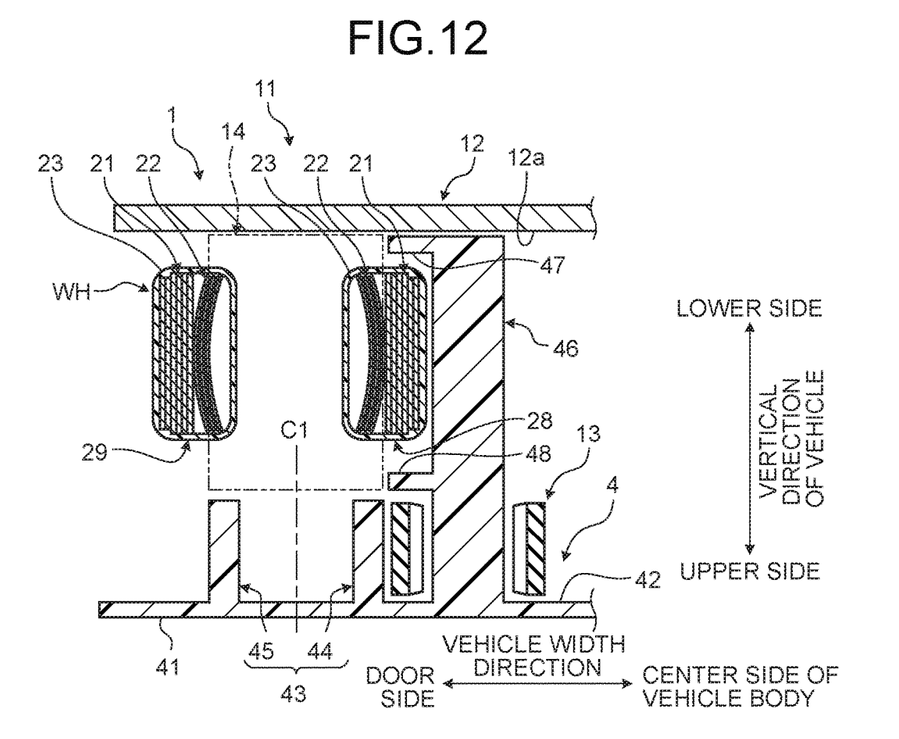
FIG. 12 is a cross-sectional view of a step member and a wire harness according to a first modification of the embodiment.

A first modification of the embodiment will be described. FIG. 12 is a cross-sectional view of a step member and a wire harness according to the first modification of the embodiment. As illustrated in FIG. 12, a wiring structure 1 for a sliding door of the first modification has a lower restricting portion 47 and an upper restricting portion 48. The lower restricting portion 47 restricts the movement of the wire harness WH toward the lower side of the vehicle. The lower restricting portion 47 is provided, for example, at a lower end portion of a partition wall 46. The lower restricting portion 47 protrudes from the partition wall 46 toward the door side in the vehicle width direction. The lower restricting portion 47 faces the lower surface of the wire harness WH in the vertical direction of the vehicle. The lower restricting portion 47 prevents the wire harness WH from coming in contact with a body panel 12.

The upper restricting portion 48 restricts the movement of the wire harness WH toward the upper side of the vehicle. The upper restricting portion 48 is provided, for example, at a central portion of the partition wall 46 in the protruding direction. The upper restricting portion 48 protrudes from the partition wall 46 toward the door side in the vehicle width direction. The upper restricting portion 48 faces the upper surface of the wire harness WH in the vertical direction of the vehicle. The upper restricting portion 48 prevents the wire harness WH from coming in contact with a step-side guide portion 43 or a belt 13. Note that the lower restricting portion 47 and the upper restricting portion 48 may be members different from a step member 4.

Second Modification of Embodiment

Figure 13:
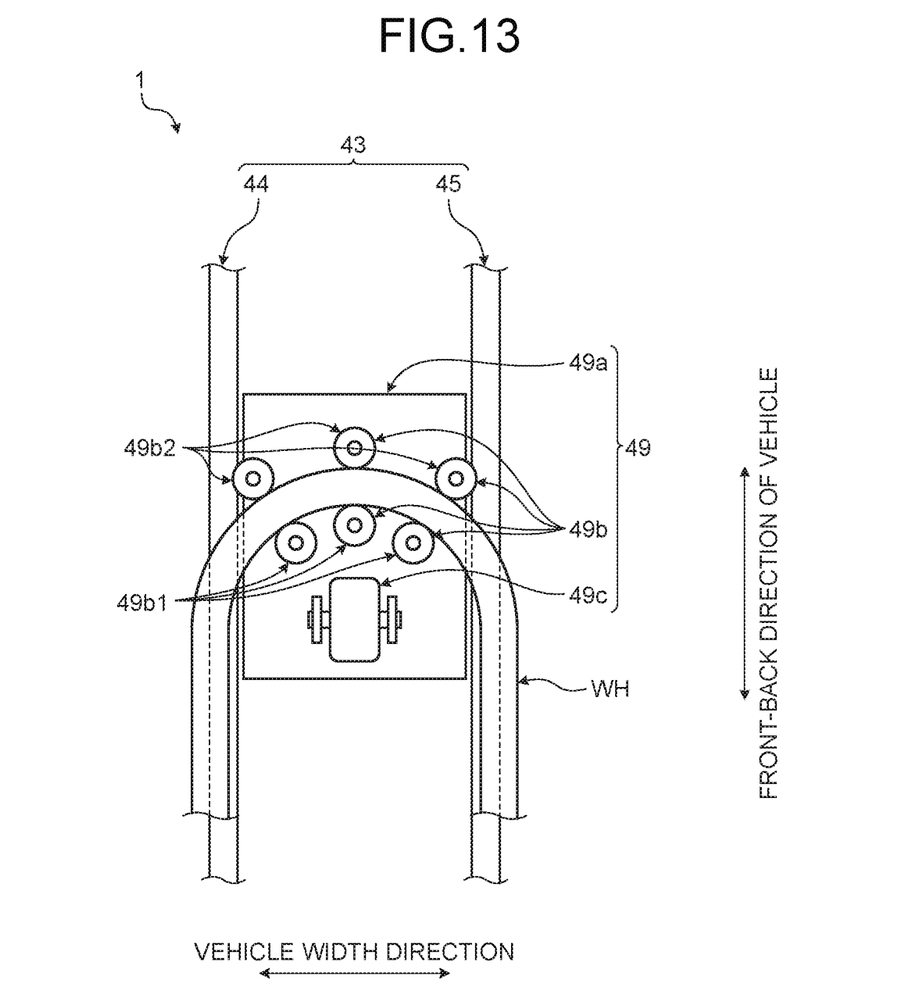
FIG. 13 is a plan view illustrating a main part of a wiring structure for a sliding door according to a second modification of the embodiment.

A second modification of the embodiment will be described. FIG. 13 is a plan view illustrating a main part of a wiring structure for a sliding door according to the second modification of the embodiment. As illustrated in FIG. 13, the wiring structure 1 for a sliding door according to the second modification includes a sliding-type forming member 49. The forming member 49 includes a slide member 49a, a plurality of holding rollers 49b, and a support roller 49c.

The slide member 49a is guided by a step-side guide portion 43. The slide member 49a is disposed between a first wall portion 44 and a second wall portion 45. The slide member 49a rotatably supports the support roller 49c. The slide member 49a may include rollers that roll on the first wall portion 44 and the second wall portion 45.

The support roller 49c is disposed on the lower side of the slide member 49a and is supported so as to rotate around the rotation axis in the vehicle width direction. The support roller 49c is supported by and rolls on a body panel 12. The holding roller 49b is rotatably supported by the slide member 49a. The holding roller 49b rotates around the axis in the vertical direction of the vehicle. The holding rollers 49b include a plurality of inner holding rollers 49b1 and a plurality of outer holding rollers 49b2. The inner holding roller 49b1 supports the wire harness WH from the inner side of the curved portion 26. The outer holding roller 49b2 supports the wire harness WH from the outer side of the curved portion 26. That is, the holding rollers 49b sandwich the wire harness WH from both sides in the thickness direction. The inner holding rollers 49b1 and the outer holding rollers 49b2 are each disposed in an arc shape with predetermined intervals therebetween. As a result, the curved portion 26 is formed at a portion of the wire harness WH sandwiched by the plurality of holding rollers 49b. The holding rollers 49b are disposed such that the portions of the wire harness WH connected to the curved portion 26 extend along the step-side guide portion 43.

The forming member 49 may be used independently or may be used together with another forming member. For example, the forming member 49 of the second modification may be used in combination with the plate-like elastic body 22 of the above embodiment. The forming member 49 also has a function as a restricting portion that restricts the positional shift of the curved portion 26. The forming member 49 can restrict the position of the curved portion 26 from being shifted toward the center side of the vehicle body or the door side from the step-side guide portion 43.

Third Modification of Embodiment

Figure 14:
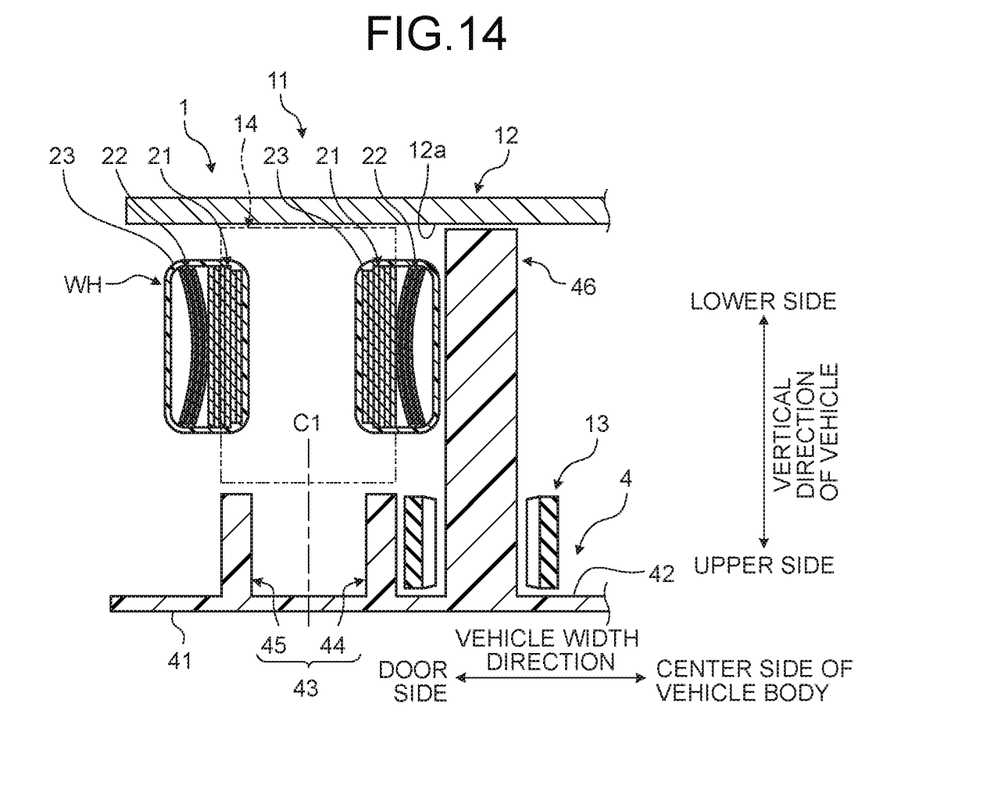
FIG. 14 is a cross-sectional view illustrating a wire harness according to a third modification of the embodiment.

A third modification of the embodiment will be described. FIG. 14 is a cross-sectional view illustrating a wire harness according to the third modification of the embodiment. As illustrated in FIG. 14, in the wire harness WH according to the third modification, the positional relationship between an FFC 21 and a plate-like elastic body 22 is different from that in the above embodiment. Specifically, the plate-like elastic body 22 is positioned on the outer side of the FFC 21. In other words, the plate-like elastic body 22 of the third modification is disposed in a curved portion 26 so as to be positioned on the outer side of the FFC 21 in the curving direction.

The plate-like elastic body 22 holds the curved FFC 21 from the outer side, whereby the shape of the FFC 21 tends to be stable. The plate-like elastic body 22 has appropriate rigidity to hold the FFC 21. Therefore, the plate-like elastic body 22 disposed on the outer side of the FFC 21 can favorably suppress the bulge of the FFC 21 outward beyond a desired shape. The plate-like elastic body 22 disposed on the outer side of the FFC 21 also protects the FFC 21 like a protector. For example, even if the wire harness WH comes in contact with another component, the plate-like elastic body 22 can protect the FFC 21 from impact.

Fourth Modification of Embodiment

A fourth modification of the embodiment will be described. The conductor is not limited to the FFC 21, and may be a linear covered electric wire or an electric wire having another shape. The protruding direction of the cross-sectional shape of the plate-like elastic body 22 may be opposite to the direction exemplified in the embodiment. That is, the plate-like elastic body 22 may protrude toward the side opposite to the conductor. The plate-like elastic body 22 is not limited to a metal plate, and may include another material such as a synthetic resin. The exterior casing 23 may be any casing as long as it can accommodate and hold the conductor and the plate-like elastic body 22 therein. For example, the exterior casing 23 may be a rubber tube. A member for extending the plate-like elastic body 22 along the conductor is not limited to the exterior casing 23. It is possible to use various members for fixing the plate-like elastic body 22 to the conductor in a state of extending along the conductor. The plate-like elastic body 22 may be fixed to the conductor by means of bonding or binding, for example.

In the above embodiment, the door-side holding portion 2 holds the wire harness WH while pressing the wire harness WH against the partition wall 46, but the present embodiment is not limited to this example. For example, the door-side holding portion 2 may hold the wire harness WH such that the portion of the wire harness WH on the vehicle body side of the door-side holding portion 2 extends from the door-side holding portion 2 toward the front side of the vehicle. In this case, the portion of the wire harness WH on the vehicle body side of the curved portion 26 extends, for example, in the front-back direction of the vehicle at a position away from the partition wall 46. The plate-like elastic body 22 forms the linear portion 27 in the portion of the wire harness WH on the vehicle body side of the curved portion 26. Even with such a configuration, it is possible to form the curved portion 26 in the trajectory space 14. In the door-side holding portion 2 and the vehicle body-side holding portion 3, a holding manner for holding the wire harness WH is determined such that the curved portion 26 is formed in the trajectory space 14. In addition, the plate thickness, the curved shape, the material, the number of installed sheets and the like of the plate-like elastic body 22 are determined such that the curved portion 26 is formed in the trajectory space 14. In the plate-like elastic body 22, the linear portion 27 is formed in the portion connected to the curved portion 26, and the linear portion 27 extends along the guide portion 11.

The forming member for forming the curved portion 26 may be a caterpillar-like exterior member, for example. Alternatively, the forming member may be a support wall that supports the wire harness WH from the side in the vehicle width direction, like the partition wall 46 of the above embodiment. For example, in the above embodiment, the curved portion 26 can be formed by the partition wall 46 without the plate-like elastic body 22. The curved portion 26 is formed adjacent to the partition wall 46 on the wire harness WH pressed against the partition wall 46 by the door-side holding portion 2. Therefore, the partition wall 46 extending along the trajectory space 14 can form the curved portion 26 in the trajectory space 14.

The curved portion 26 of the above embodiment is curved toward the front side of the vehicle, but a curved portion 26 curved toward the rear side of the vehicle may be formed instead. In this case, it is preferable that the vehicle body-side holding portion 3 and the door-side holding portion 2 each hold the wire harness WH so as to extend the wire harness WH toward the rear side of the vehicle.

The contents disclosed in the above embodiment and modifications can be implemented in appropriate combination.

A wiring structure for a sliding door according to the present embodiment includes a flexible conductor that connects a sliding door and a vehicle body across a trajectory space through which a slide portion of the sliding door passes, the slide portion being guided by a guide portion provided on a vehicle body side, and a forming member that forms a curved portion in a portion of the conductor traversing the trajectory space and extends, along the guide portion, a portion of the conductor connected to the curved portion. According to the wiring structure for a sliding door of the present embodiment, an extra portion of the conductor is accommodated in the trajectory space. Therefore, it is possible to obtain an effect of reducing a dedicated space for routing the conductor.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wiring structure for a sliding door, comprising:
    a flexible conductor that connects a sliding door and a vehicle body across a trajectory space through which a slide portion of the sliding door passes, the slide portion being guided by a guide portion provided on a vehicle body side;

a forming member that forms a curved portion in a portion of the conductor traversing the trajectory space, and extends a portion of the conductor connected to the curved portion along the guide portion; and a vehicle body-side holding portion that is provided on the vehicle body side relative to the guide portion and holds the conductor, wherein the vehicle body-side holding portion is disposed at a central portion of a moveable range of the slide portion, the moveable range being a range in which the slide portion moves when the sliding door moves between a fully closed position and a fully open position.

2. The wiring structure for a sliding door according to claim 1, wherein the forming member forms a linear portion that linearly extends in at least one of a portion of the conductor on a sliding door side relative to the curved portion and a portion of the conductor on the vehicle body side relative to the curved portion.

3. The wiring structure for a sliding door according to claim 1, wherein the forming member is a plate-like elastic body disposed along the conductor so as to deform together with the conductor, and a cross section of the forming member orthogonal to an axial direction of the conductor has a curved shape protruding toward one side.

4. The wiring structure for a sliding door according to claim 2, wherein the forming member is a plate-like elastic body disposed along the conductor so as to deform together with the conductor, and a cross section of the forming member orthogonal to an axial direction of the conductor has a curved shape protruding toward one side.

5. The wiring structure for a sliding door according to claim 3, further comprising:

a door-side holding portion that is provided on the sliding door and holds the conductor, wherein the plate-like elastic body is disposed in a range from the door-side holding portion to the vehicle body-side holding portion.

6. The wiring structure for a sliding door according to claim 3, further comprising:

a tubular exterior casing that has stretchability, and accommodates and holds the conductor and the plate-like elastic body therein.

7. The wiring structure for a sliding door according to claim 5, further comprising:

a tubular exterior casing that has stretchability, and accommodates and holds the conductor and the plate-like elastic body therein.

8. The wiring structure for a sliding door according to claim 3, wherein a plurality of flat cables are provided as the conductor.

9. The wiring structure for a sliding door according to claim 5, wherein a plurality of flat cables are provided as the conductor.

10. The wiring structure for a sliding door according to claim 6, wherein a plurality of flat cables are provided as the conductor.

11. The wiring structure for a sliding door according to claim 3, wherein the plate-like elastic body is disposed in the curved portion so as to be positioned on an inner side relative to the conductor in a curving direction.

12. The wiring structure for a sliding door according to claim 5, wherein the plate-like elastic body is disposed in the curved portion so as to be positioned on an inner side relative to the conductor in a curving direction.

13. The wiring structure for a sliding door according to claim 6, wherein the plate-like elastic body is disposed in the curved portion so as to be positioned on an inner side relative to the conductor in a curving direction.

14. The wiring structure for a sliding door according to claim 8, wherein the plate-like elastic body is disposed in the curved portion so as to be positioned on an inner side relative to the conductor in a curving direction.

15. The wiring structure for a sliding door according to claim 3, wherein a plurality of the plate-like elastic bodies are provided, and the plurality of plate-like elastic bodies and the plurality of flat cables are laminated.

16. The wiring structure for a sliding door according to claim 5, wherein a plurality of the plate-like elastic bodies are provided, and the plurality of plate-like elastic bodies and the plurality of flat cables are laminated.

17. The wiring structure for a sliding door according to claim 6, wherein a plurality of the plate-like elastic bodies are provided, and the plurality of plate-like elastic bodies and the plurality of flat cables are laminated.

18. The wiring structure for a sliding door according to claim 8, wherein a plurality of the plate-like elastic bodies are provided, and the plurality of plate-like elastic bodies and the plurality of flat cables are laminated.

19. The wiring structure for a sliding door according to claim 11, wherein a plurality of the plate-like elastic bodies are provided, and the plurality of plate-like elastic bodies and the plurality of flat cables are laminated.

20. The wiring structure for a sliding door according to claim 1, further comprising:

a restricting portion that is disposed along the guide portion, and restricts the curved portion from deviating from the trajectory space.

* * * * *